(12) United States Patent
Slutsky et al.

(10) Patent No.: US 11,770,495 B2
(45) Date of Patent: *Sep. 26, 2023

(54) GENERATING VIRTUAL IMAGES BASED ON CAPTURED IMAGE DATA

(71) Applicant: GM Global Technology Operations LLC, Detroit, MI (US)

(72) Inventors: Michael Slutsky, Kefar-Saba (IL); Albert Shalumov, Petah Tikwa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/402,000

(22) Filed: Aug. 13, 2021

(65) Prior Publication Data

US 2023/0050264 A1 Feb. 16, 2023

(51) Int. Cl.
| | |
|---|---|
| *H04N 5/262* | (2006.01) |
| *G06T 7/50* | (2017.01) |
| *G06T 7/60* | (2017.01) |
| *G06T 7/70* | (2017.01) |
| *B60R 1/00* | (2022.01) |
| *G06T 11/00* | (2006.01) |

(52) U.S. Cl.
CPC ............ *H04N 5/2628* (2013.01); *B60R 1/00* (2013.01); *G06T 7/50* (2017.01); *G06T 7/60* (2013.01); *G06T 7/70* (2017.01); *G06T 11/00* (2013.01); *B60R 2300/10* (2013.01); *G06T 2207/30244* (2013.01); *G06T 2207/30252* (2013.01)

(58) Field of Classification Search
CPC .... G06T 7/50; G06T 7/70; G06T 7/60; G06T 11/00; G06T 2207/30244; B60R 1/00; B60R 2300/10
See application file for complete search history.

(56) References Cited

U.S. PATENT DOCUMENTS

| | | | |
|---|---|---|---|
| 11,378,523 B1 | 7/2022 | Moor et al. | |
| 2002/0158873 A1* | 10/2002 | Williamson | ............... G06T 7/85 345/427 |
| 2013/0051626 A1* | 2/2013 | Abadpour | ................. G06T 7/12 382/106 |
| 2013/0342671 A1 | 12/2013 | Hummel et al. | |
| 2015/0071524 A1* | 3/2015 | Lee | ......................... G06T 7/593 382/154 |
| 2015/0279016 A1* | 10/2015 | Kim | ........................ G06T 7/521 382/154 |

(Continued)

*Primary Examiner* — Terrell M Robinson
(74) *Attorney, Agent, or Firm* — Vivacqua Crane PLLC

(57) ABSTRACT

Systems and methods for generating a virtual view of a virtual camera based on an input image are described. A system for generating a virtual view of a virtual camera based on an input image can include a capturing device including a physical camera and a depth sensor. The system also includes a controller configured to determine an actual pose of the capturing device; determine a desired pose of the virtual camera for showing the virtual view; define an epipolar geometry between the actual pose of the capturing device and the desired pose of the virtual camera; and generate a virtual image depicting objects within the input image according to the desired pose of the virtual camera for the virtual camera based on an epipolar relation between the actual pose of the capturing device, the input image, and the desired pose of the virtual camera.

11 Claims, 4 Drawing Sheets

(56) References Cited

U.S. PATENT DOCUMENTS

| | | | |
|---|---|---|---|
| 2016/0012643 A1* | 1/2016 | Kezele | H04N 13/344 |
| | | | 345/633 |
| 2019/0139297 A1* | 5/2019 | Chen | G06T 7/00 |
| 2020/0357128 A1* | 11/2020 | Mccombe | G06T 7/73 |
| 2022/0284660 A1 | 9/2022 | Slutsky et al. | |

* cited by examiner

GENERATING VIRTUAL IMAGES BASED ON CAPTURED IMAGE DATA

INTRODUCTION

The technical field generally relates to generating a virtual view based on captured image data. Particularly, the description relates to virtual view perspective change.

Modern vehicles are typically equipped with one or more optical cameras that are configured to provide image data to an occupant of the vehicle. For example, the image data show a predetermined perspective of the vehicle's surroundings.

Under certain conditions, a vehicle operator may want to change the perspective of image data provided by an optical camera. For such a purpose, virtual cameras are used, and the image data captured by one or more physical cameras are modified to show the captured scenery from another desired perspective. The modified image data may be referred to as virtual image or output image. The desired perspective onto the virtual scene may be changed in accordance with an occupant's wish. The virtual scene may be generated based on multiple images that are captured from different perspectives. However, merging image data from image sources that are located at different positions might cause undesired artifacts in the virtual image.

SUMMARY

A method for generating a virtual view of a virtual camera based on an input image is provided. The method can include determining, by a controller, an actual pose of the capturing device; determining, by the controller, a desired pose of the virtual camera for showing the virtual view; defining, by the controller, an epipolar geometry between the actual pose of the capturing device and the desired pose of the virtual camera; and generating, by the controller, a virtual image depicting objects within the input image according to the desired pose of the virtual camera for the virtual camera based on an epipolar relation between the actual pose of the capturing device, the input image, and the desired pose of the virtual camera, wherein at least one pixel corresponding to the input image is selected based on a minimum matched angle index corresponding to the actual pose of the capturing device and the desired pose of the virtual camera.

In other features, the method includes capturing the input image by the physical camera with a co-located depth sensor; wherein the capturing, by the capturing device, the input image comprises capturing, by the physical camera, an input image; assigning, by the depth sensor, depth information to pixels of the input image; wherein the determining, by the controller, the actual pose of the capturing device comprises determining, by the controller, an actual pose of the physical camera; wherein the defining, by the controller, the epipolar geometry between the actual pose of the capturing device and the desired pose of the virtual camera comprises defining, by the controller, the epipolar geometry between the actual pose of the physical camera and the desired pose of the virtual camera; and wherein the generating, by the controller, the output image for the virtual camera comprises: resampling, by the controller, the depth information of the pixels of the input image in epipolar coordinates; identifying, by the controller, target pixels on an input epipolar line of the physical camera; generating, by the controller, a disparity map for one or more output epipolar lines of the virtual camera; and generating, by the controller, the output image based on the one or more output epipolar lines.

In other features, the method includes monotonizing, by the controller, at least one minimum matched angle index based on a comparison of the at least one minimum matched angle index with an adjacent minimum matched angle index.

In other features, monotonizing at least one minimum matched angle index further comprises: comparing the adjacent minimum matched angle index to the at least one minimum matched angle index; determining whether a difference between the adjacent minimum matched angle index and the at least one minimum matched angle index is greater than a difference threshold; and removing the at least one minimum matched angle index when the difference is greater than the difference threshold.

In other features, the at least one minimum matched angle index corresponds to a pixel representing an object within an inverse occlusion region.

In other features, the minimum matched angle index is defined as $$\theta v(\theta pi) = \mathrm{argmin}_{\theta_{pi}} |\theta v(\theta pi) - \theta v|,$$

wherein:
$\theta v(\theta pi)$ is the minimum matched angle index;
$\theta v$ is an angle measurement between an axis extending from a center of the virtual camera and a vector T; and
$\theta pi$ is an angle measurement for an ith value representing an angle between a vector normal to an axis extending from a center of the physical camera.

In other features, the method includes assigning, by the depth sensor, depth information to each pixel that is captured by the physical camera.

In other features, the method includes determining by the depth sensor, a depth information of each pixel that is captured by the physical camera based on the input image.

A system for generating a virtual view of a virtual camera based on an input image is disclosed. The system can include a capturing device including a physical camera and a depth sensor, the capturing device configured for capturing the input image; a controller configured to: determine an actual pose of the capturing device; determine a desired pose of the virtual camera for showing the virtual view; define an epipolar geometry between the actual pose of the capturing device and the desired pose of the virtual camera; and generate a virtual image depicting objects within the input image according to the desired pose of the virtual camera for the virtual camera based on an epipolar relation between the actual pose of the capturing device, the input image, and the desired pose of the virtual camera, wherein at least one pixel corresponding to the input image is selected based on a minimum matched angle index corresponding to the actual pose of the capturing device and the desired pose of the virtual camera.

In other features, the controller is configured to monotonize at least one minimum matched angle index based on a comparison of the at least one minimum matched angle index with an adjacent minimum matched angle index.

In other features, the controller is configured to compare the adjacent minimum matched angle index to the at least one minimum matched angle index; determine whether a difference between the adjacent minimum matched angle index and the at least one minimum matched angle index is greater than a difference threshold; and remove the at least one minimum matched angle index when the difference is greater than the difference threshold.

In other features, the at least one minimum matched angle index corresponds to a pixel representing an object within an inverse occlusion region.

In other features, the minimum matched angle index is defined as $$\theta v(\theta pi) = \mathrm{argmin}_{\theta_{pi}} |\theta v(\theta pi) - \theta v|,$$

wherein:

$\theta v(\theta pi)$ is the minimum matched angle index;

$\theta v$ is an angle measurement between an axis extending from a center of the virtual camera and a vector T; and $\theta pi$ is an angle measurement for an ith value representing an angle between a vector normal to an axis extending from a center of the physical camera.

A vehicle including a system for generating a virtual view of a virtual camera based on an input image is disclosed. The system can include a capturing device including a physical camera and a depth sensor, the capturing device configured for capturing the input image; a controller configured to: determine an actual pose of the capturing device; determine a desired pose of the virtual camera for showing the virtual view; define an epipolar geometry between the actual pose of the capturing device and the desired pose of the virtual camera; and generate a virtual image depicting objects within the input image according to the desired pose of the virtual camera for the virtual camera based on an epipolar relation between the actual pose of the capturing device, the input image, and the desired pose of the virtual camera, wherein at least one pixel corresponding to the input image is selected based on a minimum matched angle index corresponding to the actual pose of the capturing device and the desired pose of the virtual camera.

In other features, the controller is configured to monotonize at least one minimum matched angle index based on a comparison of the at least one minimum matched angle index with an adjacent minimum matched angle index.

In other features, the controller is configured to compare the adjacent minimum matched angle index to the at least one minimum matched angle index; determine whether a difference between the adjacent minimum matched angle index and the at least one minimum matched angle index is greater than a difference threshold; and remove the at least one minimum matched angle index when the difference is greater than the difference threshold.

In other features, the at least one minimum matched angle index corresponds to a pixel representing an object within an inverse occlusion region.

In other features, the minimum matched angle index is defined as $$\theta v(\theta pi) = \mathrm{argmin}_{\theta_{pi}} |\theta v(\theta pi) - \theta v|,$$

wherein:

$\theta v(\theta pi)$ is the minimum matched angle index;

$\theta v$ is an angle measurement between an axis extending from a center of the virtual camera and a vector T; and $\theta pi$ is an angle measurement for an ith value representing an angle between a vector normal to an axis extending from a center of the physical camera.

BRIEF DESCRIPTION OF THE DRAWINGS

The exemplary implementations will hereinafter be described in conjunction with the following drawing figures, wherein like numerals denote like elements, and wherein.

DETAILED DESCRIPTION

As discussed herein, a system can generate a virtual view of a scene captured by a physical camera such that the virtual view depicts a perspective that differs from a perspective captured by the physical camera. Since some pixels may be included within an inverse occlusion region, the system can determine one or more pixels to include within the virtual view. For example, the system can determine a minimum matched angle index that corresponds to a pixel. The system also compares the minimum matched angle index to adjacent minimum matched angle indexes to determine an oscillating behavior. When a difference between the minimum matched angle index to adjacent minimum matched angle indexes is greater than a difference threshold, the system removes the minimum matched angle index having a greater value.

Figure 1:
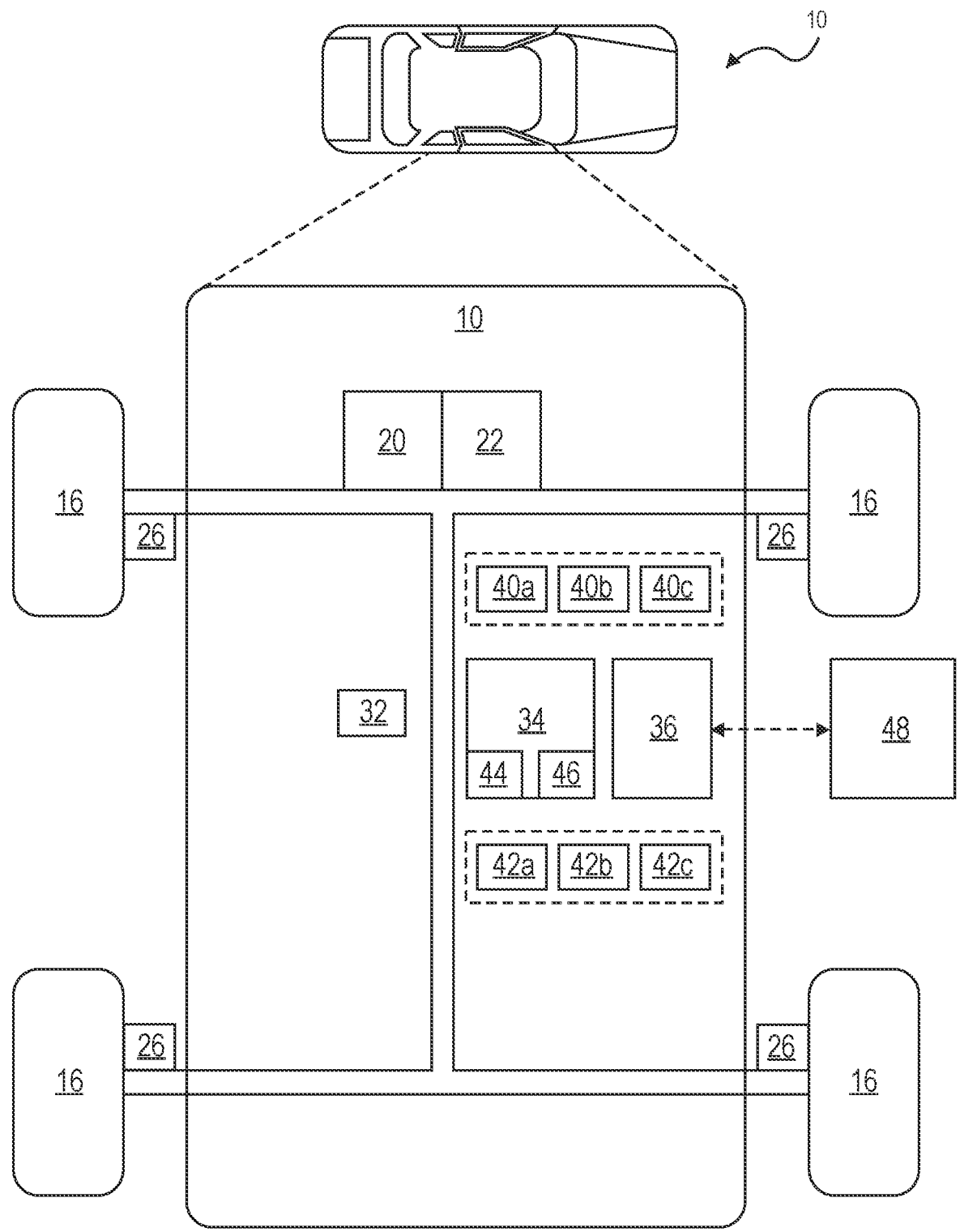
FIG. 1 is a schematic illustration of a vehicle including a controller configured to generate a virtual view.

With reference to FIG. 1, a vehicle 10 is shown in accordance with various implementations. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various implementations, the vehicle 10 is an autonomous vehicle. The autonomous vehicle is, for example, a vehicle that is automatically controlled to carry passengers from one location to another. The vehicle 10 is depicted in the illustrated implementation as a passenger car, but it should be appreciated that any other vehicle including motorcycles, trucks, sport utility vehicles (SUVs), recreational vehicles (RVs), marine vessels, aircraft, etc., can also be used. In an exemplary implementation, the autonomous vehicle is an automation system of Level Two or higher. A Level Two automation system indicates "partial automation". However, in other implementations, the autonomous vehicle may be a so-called Level Three, Level Four or Level Five automation system. A Level Three automation system indicates conditional automation. A Level Four system indicates "high automation", referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various implementations, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various implementations, the transmission system 22 may include a step-ratio automatic transmission, a continuously-variable transmission, or other appropriate transmission. The brake system 26 is configured to provide braking torque to the vehicle wheels 16 and 18. The brake system 26 may, in various implementations, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some implementations contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc.

Figure 2:
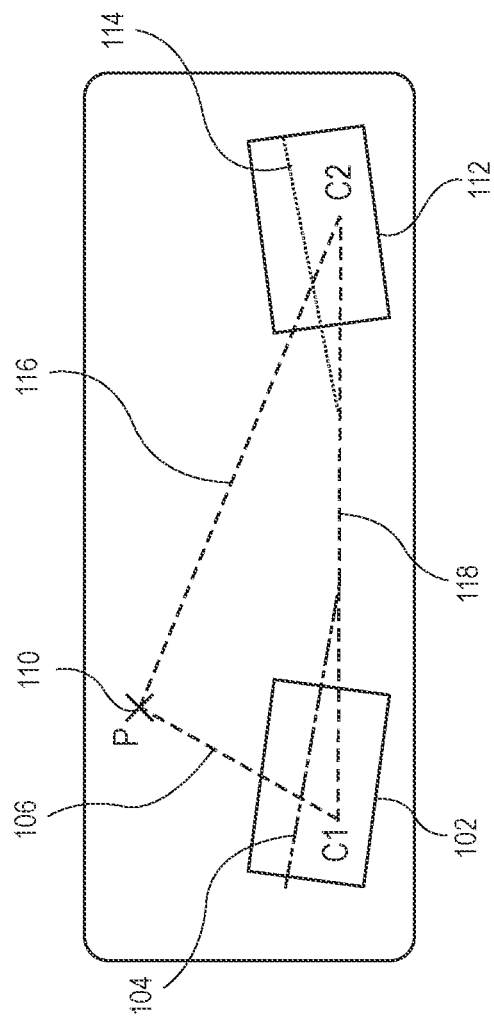
FIG. 2 is a schematic illustration of the principles of epipolar geometry with reference to two cameras.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various implementations, the data storage device 32 stores defined maps of the navigable environment. In various implementations, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 34, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, implementations of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Generally, in accordance with an implementation, the vehicle 10 includes a controller 34 that generates a virtual view of a virtual camera based on an input image captured by a capturing device. The capturing device includes, for example, a physical camera and a depth sensor. At least one of the sensing devices 40a to 40n is an optical camera and at least one of these sensing devices 40a to 40n is a physical depth sensor (e.g., LIDAR, Radar, ultrasonic sensor, or the like). In one or more implementations, the vehicle 10 can generate a virtual view of a scene captured by a physical camera 40a with a co-located or spatially separated depth sensor 40b.

An input image is captured by a physical camera 40a, e.g., an optical camera that captures color images of the environment. The physical camera 40a is arranged at the vehicle 10 so that it can cover a certain field-of-view of the vehicle's 10 surroundings. Depth information is assigned to the pixels of the input image to estimate the distance between the physical camera 40a and an object that is represented by the pixels of the input image. Depth information may be assigned to each pixel of the input image, by a dense or sparse depth sensor or by a module that is configured to determine the depth based on image information.

The desired view location and view direction of the virtual camera may be referred to as the desired perspective of the virtual camera. Additionally, intrinsic calibration parameters of the virtual camera may be given to determine the field-of-view, the resolution, and optionally or additionally other parameters of the virtual camera. The desired perspective may be a perspective as defined by a user of a vehicle. Thus, the user or occupant of a vehicle may choose a perspective of the virtual camera onto the vehicle's surroundings.

The desired pose of the virtual camera may include the view location and view direction with respect to a reference point or reference frame, e.g., the view location and view direction of the virtual camera with respect to a vehicle. The desired pose is a virtual point where a user wants a virtual camera to be located including the direction into which the virtual camera points. The desired pose may be changed by a user of a vehicle to generate a virtual view of the vehicle 10 and its environment from different view locations and for different view directions. The actual pose of the physical camera is determined to have information about the perspective from which the input image is captured.

The depth sensor 40b may be a physical depth sensor or a module (e.g., a virtual depth sensor) that assigns depth information to a pixel or an object of the input image based on image information. Examples for a physical depth sensor are ultrasonic sensors, radar sensors, lidar sensors, or the like. These sensors are configured to determine a distance to a physical object depicted within the input image. The distance information determined by the physical depth sensors are then assigned to the pixels of the input image. A virtual depth sensor determines or estimates depth information based on the image information. To generate an appropriate output image for the pose of the virtual camera, it might be sufficient if the depth information provided by the virtual depth sensor are consistent.

Generally, the depth sensor 40b may be a sparse depth sensor or a dense depth sensor. A sparse depth sensor provides depth information for some pixels and regions of the input image, but not for all pixels. A sparse depth sensor does not provide a continuous depth map. A dense depth sensor provides depth information for every pixel of the input image. When the depth sensor is a dense depth sensor, reprojection of depth values onto the image of the virtual camera is performed with the co-located depth sensor.

FIG. 1 illustrates a vehicle 10 that includes a system that generates a virtual view of a virtual camera based on an input image. The system includes a physical camera 40a, a depth sensor 40b, and a controller 34. In various implementations, the depth sensor 40b can be co-located with the physical camera 40a. In another example implementation, the depth sensor 40b can be spatially separated from the physical camera 40a. The controller 34 can receive and analyze data from physical camera 40a and the depth sensor 40b substantially continuously and/or periodically. For ease of convenience, a first camera 102 may refer to the physical camera 40a, and the second camera 112 may refer to the virtual camera.

FIG. 2 illustrates the principles of the epipolar geometry with reference to a first camera 102 with the camera center C1 and a second camera 112 with the camera center C2. A first epipolar line 104 is defined in the first camera 102. A ray 106 defines the position of the pixel P (indicated with 110) on the epipolar line 104. The position of the same pixel P 110 is also defined on epipolar line 114 by ray 116 that extends from the camera center C2 of the second camera 112 to the pixel P. Reference sign 118 is a vector between the two camera centers C1 and C2. Given the vector 118 and the known position of pixel P on the epipolar line 104 as well as the distance between the camera center C and pixel P, the position of pixel P on the epipolar line 114 can be determined. With this underlying principle, the scene captured by the first camera 102 can be used to calculate a scene as it would be observed with the second camera 112. The virtual position of the second camera 112 can be varied. Consequently, the position of the pixels on the epipolar line 114 also varies when the position of the second camera 112 is varied. In various implementations described herein, a virtual view perspective change is enabled. This virtual view perspective change may be advantageously used for generating surround views and for trailering applications. Using the epipolar geometry for generating the virtual view considers the three-dimensional nature of the environment of a vehicle, particularly by considering the depth of a pixel P (distance between pixel P and camera center C1 of the first camera 102) when generating the virtual view of the second camera 112.

The controller 34 can generate a virtual image of a scene captured by the first camera 102 having a co-located depth sensor, e.g., depth sensor 40b. As used herein, the virtual image can be defined as a synthetic image generated by the controller 34 such that the virtual image depicts one or more objects depicted within the scene captured by the first camera 102 from a desired view location and view direction. The controller 34 can receive input camera pose data from the first camera and desired pose data, i.e., from the perspective of the virtual camera. The controller 34 may also retrieve the intrinsic parameters of the first camera 102, which can include focal distance, principal point, distortion model, etc. The input camera pose data and the desired pose data are used to define an epipolar geometry between the first camera and the second camera 122.

The controller 34 can use the intrinsic calibration parameters of the viewpoint poise data and/or of the input camera to define the epipolar geometry. The controller 34 can receive an input depth map that includes depth information of the input image and the input. Based on the epipolar geometry, the input depth map and the input image are resampled in epipolar coordinates. The controller 34 can use suitable direction cost functions to minimize each output pixel, and for each output epipolar line, the controller 34 identifies target pixel(s) along the corresponding input epipolar line. The controller 34 can generate a disparity map that is the basis for generating the virtual image.

Figure 3:
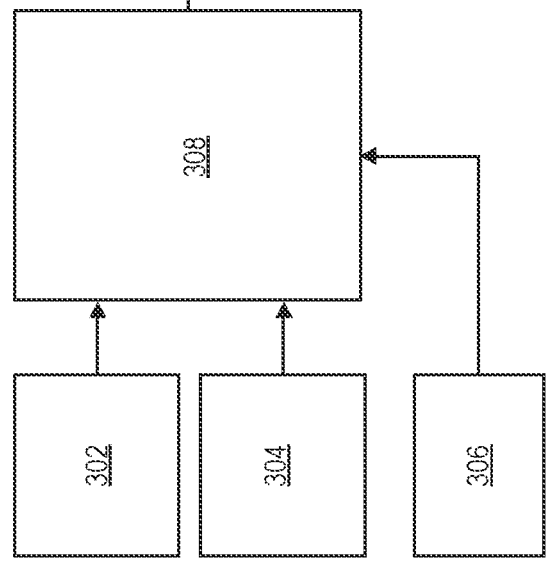
FIG. 3 is a block diagram illustrating an example method for generating a virtual view.

However, one or more pixels within the input image may be within an inverse occlusion region. FIG. 3 is a block diagram illustrating a process 300 for mitigating inverse occlusions caused by a perspective change in a virtual image generated based on epipolar reprojection. Blocks of the process 300 can be executed by the controller 34. At block 302, an input depth map including depth information of an input image from the physical camera 102 is received, and at block 304, the input image is received. At block 306, intrinsic calibration and alignment parameters of the viewpoint pose data and/or of the depth sensor pose are acquired. The intrinsic calibration parameters of the viewpoint pose data and/or of the depth sensor pose data may then be used to define the epipolar geometry.

At block 308, epipolar geometry is generated based on the viewpoint pose data of the virtual camera and the depth sensor pose data. For example, the intrinsic calibration and alignment parameters of the viewpoint pose data and/or of the depth sensor pose data may be used to generate the epipolar geometry. The input image data and/or the input depth map data can be resampled in epipolar coordinates at block 308. The input image data and/or the input depth map data can be resampled in epipolar coordinates based on the generated epipolar geometry.

At block 310, the controller 34 computes a matched angle index for each pixel. The matched angle index can be computed based on Equation 1:

$$\theta v(\theta pi) = \angle(T, T + Rpi(\theta pi))  \quad \text{Equation 1.}$$

The controller 34 determines the minimum value of the matched angle index according to Equation 2:

$$\theta v(\theta pi) = \text{argmin}_{\theta pi} |\theta v(\theta pi) - \theta v  \quad \text{Equation 2,}$$

Figure 4:
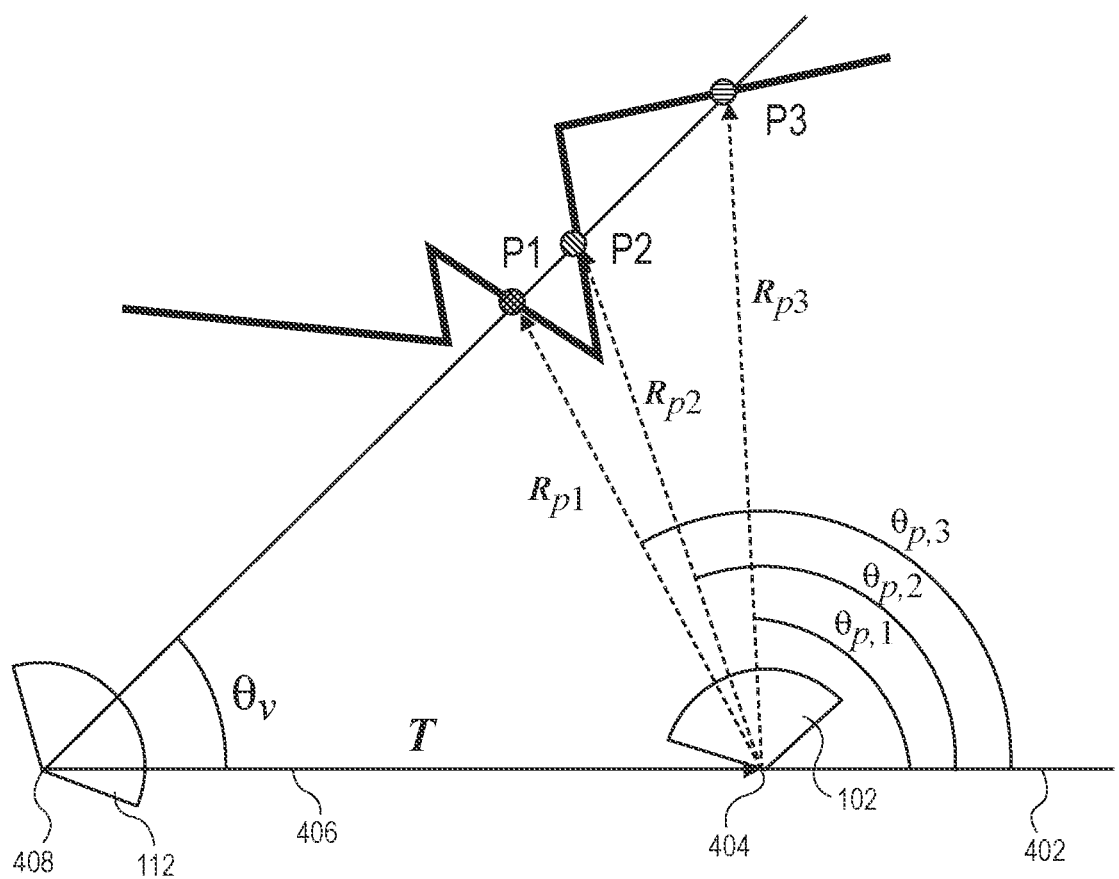
FIG. 4 is a schematic illustration of a capturing device capturing an input image from a first perspective and a perspective of the virtual image relative to the capturing device.
Figure 5:
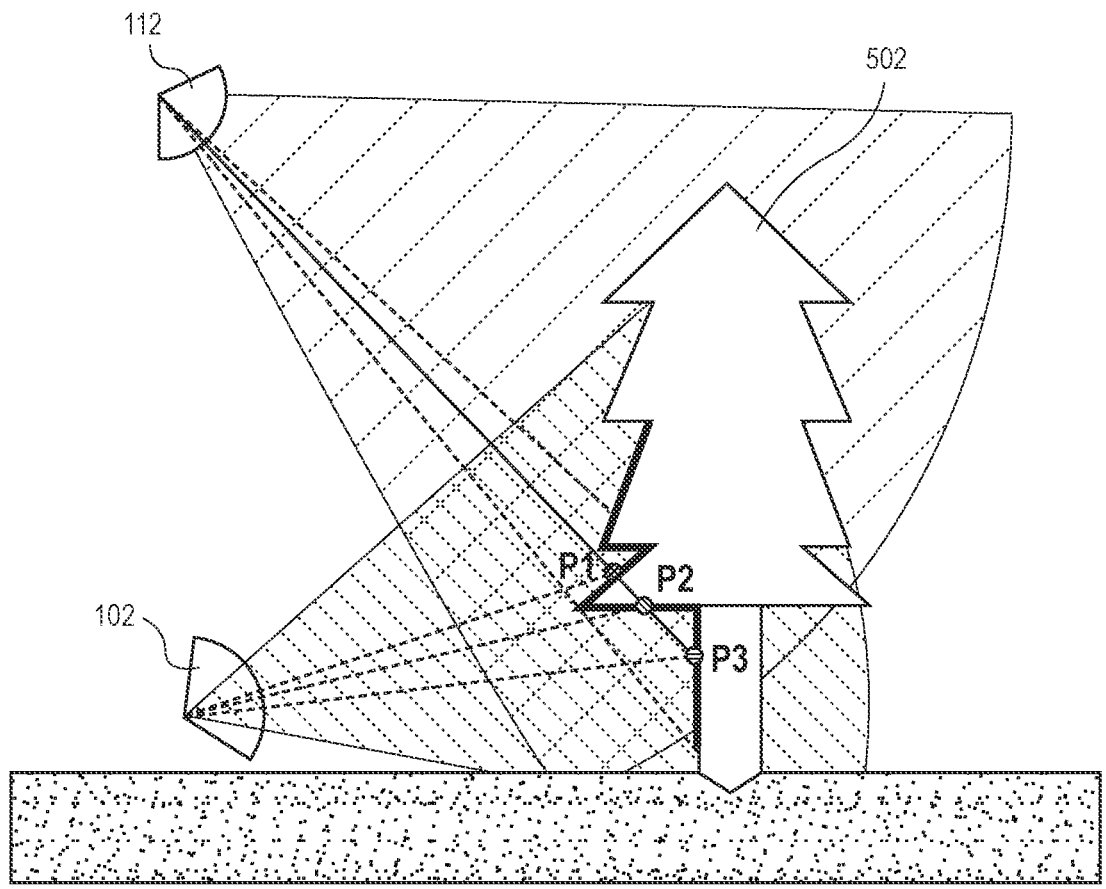
FIG. 5 is another schematic illustration of a capturing device capturing an input image from a first perspective and a perspective of the virtual image relative to the capturing device.

Referring to FIGS. 4 and 5, θv is an angle measurement between an axis, i.e., an epipolar line, extending from a center 408 of the virtual camera and a vector T, θpi is an angle measurement for an ith value representing an angle between vector 402 that is normal to an axis extending from a center 404 of the physical camera, vector T is a known vector 406 between the center 404 of the physical camera and a center 408 of the virtual camera, Rpi is a vector 412 for the ith value between the center 404 of the physical camera and a corresponding pixel P1, P2, or P3. The vector 412 represents a distance between the center of the physical camera and the corresponding portion of an object captured by the physical camera that is represented by pixel P1, P2, or P3.

The controller 34 generates a virtual image, i.e., a synthetic image, from a perspective of the virtual camera based on the image data captured by the physical camera and the depth sensor. Referring to FIG. 5, the first camera 102 captures images depicting an object 502, such as a tree. The controller 34 generates virtual images representing the captured object 502 from the desired perspective of the virtual camera. As shown, points P2 and P3 are within a field-of-view of the physical camera but not within a field-of-view of the virtual camera due to inverse occlusion. Based on a frame of reference for the virtual camera, the generated virtual image should include a pixel representing point P1 since point P1 is within the field-of-view of the physical camera and the virtual camera.

The controller 34 computes and sorts the minimum matched angle index for each pixel within the captured images. At block 312, the controller 34 monotonizes, i.e., removes, the minimum matched angle index values corresponding to pixels within the inverse occlusion region. In an example implementation, the controller 34 detects an oscillating behavior of the minimum matched angle indexes, i.e., difference between adjacent minimum matched angle index value. For example, each minimum matched angle index can be compared to adjacent minimum matched angle indexes to determine a difference between each value. If the difference between the adjacent minimum matched angle indexes is greater than a difference threshold, the minimum matched angle index having a greater value is removed, i.e., monotonized.

At block 314, the virtual image is generated based on the input image of the physical camera. For example, based on the epipolar geometry, the input depth map and the input image are resampled in epipolar coordinates. A disparity map can then be generated based on suitable epipolar calculations, and the virtual image is generated by the controller 34 according to the disparity map. For pixels that correspond to portions of an object within the inverse occlusion region, pixels are selected that correspond to the calculated minimum matched angle index are selected for inclusion in the virtual image. For example, a pixel corresponding to the calculated minimum matched angle index captured by the physical camera, e.g., point P1 shown in FIG. 5, is selected for inclusion in the virtual image.

While at least one exemplary implementation has been presented in the foregoing detailed description, it should be appreciated that a vast number of variations exist. It should also be appreciated that the exemplary implementation or exemplary implementations are only examples, and are not intended to limit the scope, applicability, or configuration of the disclosure in any way. Rather, the foregoing detailed description will provide those skilled in the art with a convenient road map for implementing the exemplary implementation or exemplary implementations. It should be understood that various changes can be made in the function and arrangement of elements without departing from the scope of the disclosure as set forth in the appended claims and the legal equivalents thereof.

The detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Implementations of the present disclosure may be described herein in terms of functional and/or logical block components and various processing steps. It should be appreciated that such block components may be realized by any number of hardware, software, and/or firmware components configured to perform the specified functions. For example, an implementation of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that implementations of the present disclosure may be practiced in conjunction with any number of systems, and that the systems described herein is merely exemplary implementations of the present disclosure.

What is claimed is:

1. A method for generating a virtual view of a virtual camera based on an input image, the method comprising:
   determining, by a controller, an actual pose of a capturing camera having a co-located depth sensor;
   capturing the input image by the capturing camera;
   assigning, by the depth sensor, depth information to pixels of the input image;
   determining, by the controller, a desired pose of the virtual camera for showing the virtual view;
   defining, by the controller, an epipolar geometry between the actual pose of the capturing camera and the desired pose of the virtual camera;
   generating, by the controller, a virtual image depicting objects within the input image according to the desired pose of the virtual camera for the virtual camera based on an epipolar relation between the actual pose of the capturing camera, the input image, and the desired pose of the virtual camera by resampling the depth information of the pixels of the input image in epipolar coordinates, identifying target pixels on an input epipolar line of the capturing camera, generating a disparity map for one or more output epipolar lines of the virtual camera, and generating the virtual view based on the one or more output epipolar lines, wherein at least one pixel corresponding to the input image is selected based on a minimum matched angle index corresponding to the actual pose of the capturing device and the desired pose of the virtual camera;

monotonizing, by the controller, at least one minimum matched angle index based on a comparison of the at least one minimum matched angle index with an adjacent minimum matched angle index;

comparing the adjacent minimum matched angle index to the at least one minimum matched angle index;

determining whether a difference between the adjacent minimum matched angle index and the at least one minimum matched angle index is greater than a difference threshold; and removing the at least one minimum matched angle index when the difference is greater than the difference threshold.

2. The method of claim 1, wherein the at least one minimum matched angle index corresponds to a pixel representing an object within an inverse occlusion region.

3. The method of claim 1, wherein the minimum matched angle index is defined as $$\theta v(\theta pi)=\mathrm{argmin}_{\theta pi}|\theta v(\theta pi)-\theta v|,$$

wherein:

$\theta v(\theta pi)$ is the minimum matched angle index;

$\theta v$ is an angle measurement between an axis extending from a center of the virtual camera and a vector T; and $\theta pi$ is an angle measurement for an ith value representing an angle between a vector normal to an axis extending from a center of the capturing camera.

4. The method of claim 1, wherein the assigning, by the depth sensor, depth information to pixels of the input image comprises:

assigning, by the depth sensor, depth information to each pixel that is captured by the capturing camera.

5. The method of claim 1, wherein the assigning, by the depth sensor, depth information to pixels of the input image comprises:

determining by the depth sensor, a depth information of each pixel that is captured by the capturing camera based on the input image.

6. A system for generating a virtual view of a virtual camera based on an input image, the system comprising:

a capturing device including a physical camera and a depth sensor, the capturing device configured for capturing the input image;

a controller configured to:

determine an actual pose of the capturing device;

determine a desired pose of the virtual camera for showing the virtual view;

define an epipolar geometry between the actual pose of the capturing device and the desired pose of the virtual camera;

generate a virtual image depicting objects within the input image according to the desired pose of the virtual camera for the virtual camera based on an epipolar relation between the actual pose of the capturing device, the input image, and the desired pose of the virtual camera, wherein at least one pixel corresponding to the input image is selected based on a minimum matched angle index corresponding to the actual pose of the capturing device and the desired pose of the virtual camera;

monotonize at least one minimum matched angle index based on a comparison of the at least one minimum matched angle index with an adjacent minimum matched angle index;

compare the adjacent minimum matched angle index to the at least one minimum matched angle index;

determine whether a difference between the adjacent minimum matched angle index and the at least one minimum matched angle index is greater than a difference threshold; and remove the at least one minimum matched angle index when the difference is greater than the difference threshold.

7. The system of claim 6, wherein the at least one minimum matched angle index corresponds to a pixel representing an object within an inverse occlusion region.

8. The system of claim 7, wherein the minimum matched angle index is defined as $$\theta v(\theta pi)=\mathrm{argmin}_{\theta pi}|\theta v(\theta pi)-\theta v|,$$

wherein:

$\theta v(\theta pi)$ is the minimum matched angle index;

$\theta v$ is an angle measurement between an axis extending from a center of the virtual camera and a vector T; and $\theta pi$ is an angle measurement for an ith value representing an angle between a vector normal to an axis extending from a center of the physical camera.

9. A vehicle, comprising a system for generating a virtual view of a virtual camera based on an input image, the system comprising:

a capturing device including a physical camera and a depth sensor, the capturing device configured for capturing the input image;

a controller, configured to:

determine an actual pose of the capturing device;

determine a desired pose of the virtual camera for showing the virtual view;

define an epipolar geometry between the actual pose of the capturing device and the desired pose of the virtual camera;

generate a virtual image depicting objects within the input image according to the desired pose of the virtual camera for the virtual camera based on an epipolar relation between the actual pose of the capturing device, the input image, and the desired pose of the virtual camera, wherein at least one pixel corresponding to the input image is selected based on a minimum matched angle index corresponding to the actual pose of the capturing device and the desired pose of the virtual camera;

monotonize at least one minimum matched angle index based on a comparison of the at least one minimum matched angle index with an adjacent minimum matched angle index;

compare the adjacent minimum matched angle index to the at least one minimum matched angle index;

determine whether a difference between the adjacent minimum matched angle index and the at least one minimum matched angle index is greater than a difference threshold; and remove the at least one minimum matched angle index when the difference is greater than the difference threshold.

10. The vehicle of claim 9, wherein the at least one minimum matched angle index corresponds to a pixel representing an object within an inverse occlusion region.

11. The vehicle of claim 10, wherein the minimum matched angle index is defined as $$\theta v(\theta pi) = \operatorname{argmin}_{\theta pi} |\theta v(\theta pi) - \theta v|,$$

wherein:

$\theta v(\theta pi)$ is the minimum matched angle index;

$\theta v$ is an angle measurement between an axis extending from a center of the virtual camera and a vector T; and $\theta pi$ is an angle measurement for an ith value representing an angle between a vector normal to an axis extending from a center of the physical camera.

* * * * *